April 22, 1952     M. A. STICELBER     2,593,705
DOUGH MIXER WITH DOUGH GRIPPING
AND REFRIGERATED WALL Filed June 21, 1948     2 SHEETS—SHEET 1

INVENTOR.
MERLIN A. STICELBER
BY
Alfred R. Fuchs
ATTORNEY

April 22, 1952

M. A. STICELBER 2,593,705

DOUGH MIXER WITH DOUGH GRIPPING
AND REFRIGERATED WALL

Filed June 21, 1948

INVENTOR.
MERLIN A. STICELBER

BY Alfred R. Fuchs

ATTORNEY

Patented Apr. 22, 1952

2,593,705

UNITED STATES PATENT OFFICE 2,593,705

DOUGH MIXER WITH DOUGH GRIPPING AND REFRIGERATED WALL

Merlin A. Sticelber, Kansas City, Mo., assignor to Stickelber & Sons, Inc., a corporation of Missouri Application June 21, 1948, Serial No. 34,294

3 Claims. (Cl. 62—1)

1

My invention relates to dough mixers, and more particularly to refrigerated dough mixers provided with dough gripping and cooling means.

It is a purpose of my invention to provide a dough mixer that is capable of mixing sponges and doughs with greater efficiency than is possible with the ordinary dough mixer bowl, thus saving considerable power and also saving considerable manpower, in that a shorter time is required for mixing the doughs and sponges.

My invention is an improvement over the invention disclosed and claimed in my Patent No. 2,415,711 on Refrigerated Dough Mixer, patented February 11, 1947.

Among the advantages of my invention is that it provides a better gluten development in the dough and greater absorption of water, thus producing a better dough than was possible before my invention.

More specifically it is a purpose of my invention to provide new and improved means for refrigerating a dough mixer, that is also provided with dough gripping means so that the slippage of the dough ordinarily existing on the smooth wall of a dough mixer is avoided. This provides a more decided pulling and kneading action than is possible with an agitator operating in a dough mixer that is not provided with my improved dough gripping means. By providing a combined dough gripping or movement retarding means, more efficient cooling of the dough or other contents of the mixer and better and quicker mixing of the dough takes place.

It has been found that the desired gripping action combined with efficient cooling action can be best obtained by providing the refrigerant passages on the outer surface of the sheet that forms the dough mixer wall and to provide said sheet with a large number of relatively small protuberances in order to obtain the increase in area of the cooling surface that is desired and to obtain the desired gripping action, rather than to provide the conduit forming means on the inner face of said sheet over all or a portion of the area thereof, as was true in my above referred to patent.

While it is not absolutely necessary that the entire area of the dough mixer wall that is cooled, with which the dough comes in contact, is provided with the gripping means, this is preferred, but it is highly necessary that the portion of the wall of the mixer, at which the agitator arms recede from or move away from the wall in the rotation of the agitator, be provided with the dough gripping means so that the pulling action

2 desired will be exerted by the agitator members in combination with the holding means provided by the roughening of the surface of the dough mixer wall by the protuberances or similar gripping means.

It has been found that a particularly efficient cooling action is obtained by providing a wall for the dough mixer that has an increased cooling area provided by means of projections or protuberances thereon that also act as dough gripping means, which wall portion has a plurality of members welded thereto and to each other in overlapping arrangement in the manner described and shown in my co-pending application, Serial No. 614,723, filed September 6, 1945 now Patent No. 2,504,465, April 18, 1950, on Refrigerated Dough Mixer.

Other objects and advantages of my invention will appear as the description of the drawings proceeds. I desire to have it understood, however, that I do not intend to limit myself to the particular details shown or described, except as defined in the claims.

Figure 1:
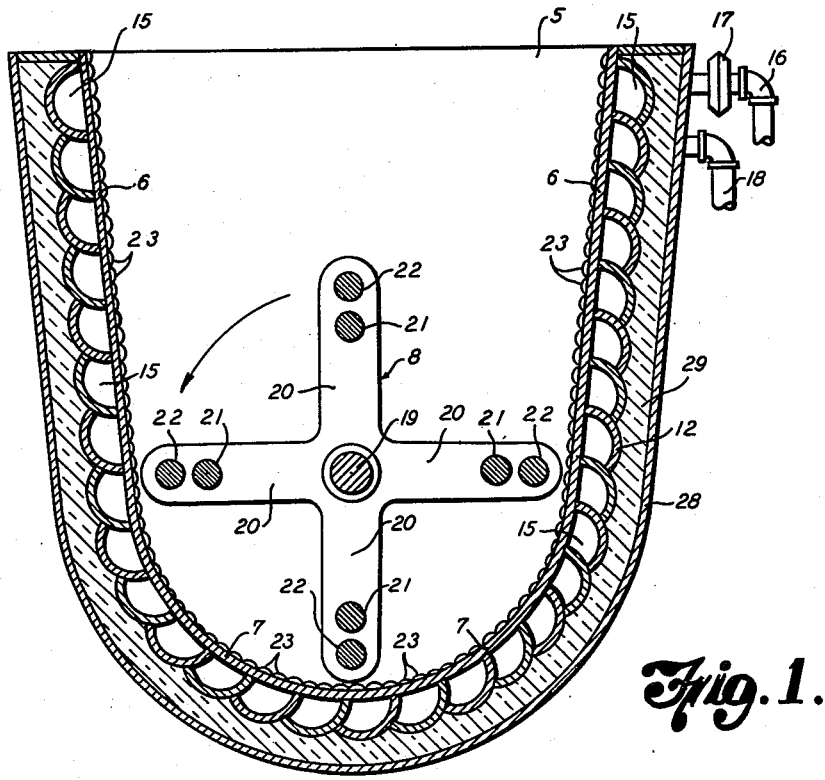
Fig. 1 is a vertical sectional view through a dough mixer bowl of the tiltable type, showing my improved refrigerating and dough gripping means applied thereto.

Referring in detail to the drawings, in Fig. 1 is shown a dough mixer having a tiltable bowl having end walls 5, between which is mounted a dough contacting wall made up of the inclined wall portions 6 and a curved wall portion 7 connecting said inclined wall portions. An agitator 8 is provided for agitating the contents of the mixer and periodically engaging the same with the dough engaging wall portions of the mixer.

Figure 2:
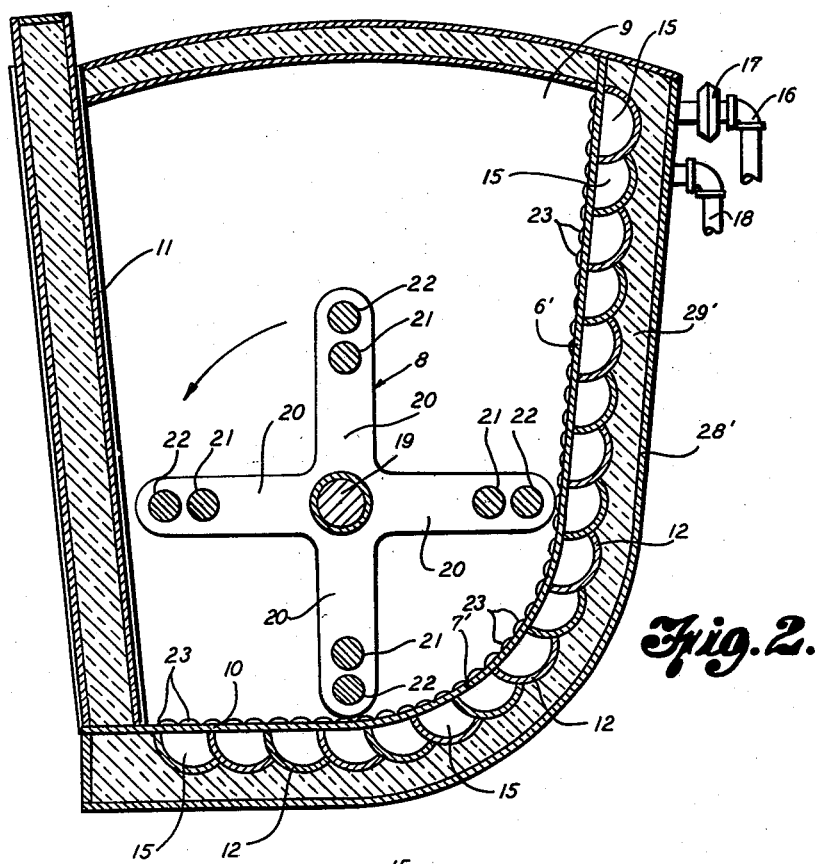
Fig. 2 is a similar view of a dough mixer that has a fixed bowl with a movable wall portion, showing my invention applied thereto.

In Fig. 2 is shown a dough mixer that has a body portion 9, which is provided with a mixing chamber of a similar shape to that shown in Fig. 1, but having a fixed wall portion that has an inclined wall portion 6' and a curved wall portion 7', said curved wall portion terminating in a plane wall portion 10. The portions 6' and 7' are similar to the portions 6 and 7 of the dough mixer shown in Fig. 1. A door or closure member 11 forms the remainder of the dough engaging wall of the mixer when in its closed position. Inasmuch as the door 11 is slidable up and down, it is difficult to provide refrigerating means for the dough engaging portion formed by this door, and it is customary in dough mixers of the type shown in Fig. 2, to provide refrigerating means only for the wall portions 6', 7' and 10.

Figure 3:
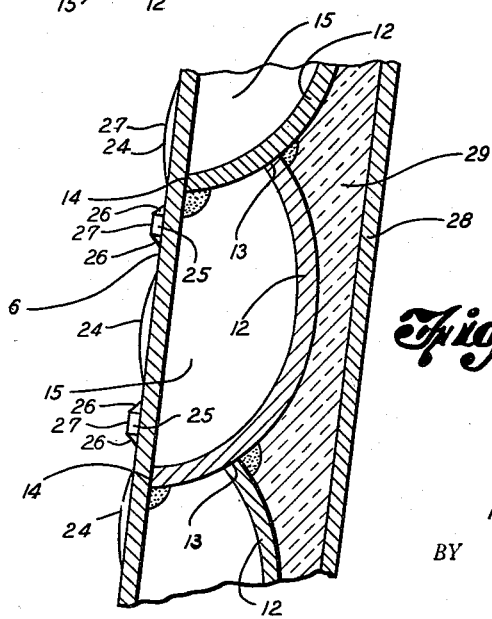
Fig. 3 is a fragmentary sectional view of my improved cooling and dough gripping means, on an enlarged scale, taken substantially on the line 3—3 of Fig. 4.

In Fig. 3 a portion of a wall 6 that is a dough contacting wall is shown, and to this wall portion channel members 12 are welded in a similar manner to that described in my copending application above referred to. The channel members are substantially U-shaped or semi-cylindrical in cross section and are arranged in overlapping relation, as shown in Fig. 3, so that the one longitudinal edge 13 of each of said members is welded to the outer curved surface of a channel member 12 lying next thereto, and the other longitudinal edge 14 is welded to the outer face of the wall 6. The overlapping channel members are connected together in the same manner as described in my co-pending application, so that the adjacent refrigerant passages 15 thus provided are connected together alternately at their opposite ends so as to provide a flow in opposite directions through the adjacent passages, and a single circuitous conduit for the refrigerant made up of all of the passages in succession is thus provided, one end of the cooling or refrigerant coil thus provided being connected with a refrigerant inlet connection 16 through a suitable expansion device 17 and the other end being connected with a return or suction connection 18 in a well known manner. Thus in the form of the invention shown in Fig. 1 the refrigerant enters first the uppermost passage 15 at the right hand side of the mixer bowl, as shown in said figure, and successively passes through the adjoining passages back and forth until it reaches the uppermost passage 15 on the opposite side of the mixer bowl, from which a suitable return passage, such as shown in my above referred to co-pending application, extends to the outlet connection 18. The cooling coil shown in the form of the invention shown in Fig. 2 is similarly arranged so that the refrigerant will enter the uppermost passage 15 first and will pass through the successive adjacent passages 15 until it finally passes from the last passage 15 nearest the door 11 through a suitable return conduit to the return or outlet connection 18.

Preferably, my improved refrigerated dough mixer is cooled by means of direct expansion and for that reason the inlet connection is shown as being provided with an expansion device. However, the same advantage would exist to the extent of the capabilities of the cooling medium if brine or other cooling liquid were utilized in a cooling coil made in accordance with my invention.

While the overlapped tube construction is found to be the most advantageous for efficient cooling purposes, inasmuch as substantially the entire area of the dough mixer wall that is provided with the overlapping conduit means is cooled thereby, the areas of the walls 6, 7, 6', 7' and 10 that form portions of the cooling medium conduits being greatly increased by such overlapping tube arrangement over one in which both longitudinal edges of each of the channel members is welded to the cooled wall, yet the particular improvement forming the subject matter of this invention is adapted for use with other conduit forming arrangements as long as the conduits for the refrigerant are formed on the dough mixer wall, so that the cooled wall portion forms part of the conduit wall for the cooling medium or refrigerant.

While a particular agitator in the dough mixer bowl is illustrated in the drawings, the type of agitator used may vary in the details of construction thereof without departing from the purpose of my invention. In the drawings the agitator is shown as being provided on a shaft 19, which is mounted for rotation in any suitable manner, so that in the form of the invention shown in Fig. 1 the dough mixer bowl can be tilted about the axis of the shaft 19 to dump the contents thereof in a well known manner. The agitator, as above pointed out, may vary in design in accordance with the requirements of the baker, the form of agitator illustrated being a common form that comprises a pair of spiders having arms 20 that extend outwardly from the shaft 19, the spiders being fixed to the shaft to rotate therewith. On the arms 20 are mounted rod-like members 21 and 22. The same form of agitator is illustrated in Figs. 1 and 2, although it is not necessary that the same form of agitator be provided in all types of dough mixers nor in the same type of dough mixer. The important thing is that longitudinally extending members, such as the members 22, are provided, that move closely adjacent the dough mixer wall at certain points, due to the fact that said longitudinally extending members 22 are located at the outer ends of the arms 20. Preferably, the longitudinally extending members 22 of the agitator are straight or substantially straight. However, the advantages of my invention will exist in other forms of agitators and having other types of longitudinal members of varying shapes, as may be found desirable by individual bakers.

Figure 4:
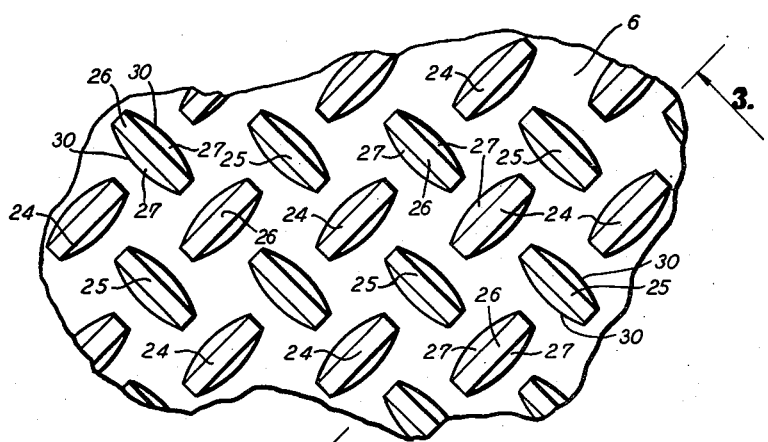
Fig. 4 is a fragmentary face view of the dough mixer wall, showing my improvement applied thereto, on an enlarged scale.

It has been found that instead of providing large corrugations or ribs on the inner surface of the dough engaging walls of the mixer, a better retarding or gripping effect of a more uniform character is obtained by providing a plurality of small protuberances 23 on the dough mixer wall. Preferably, the protuberances 23 are rolled in the sheet from which the wall portions 6 and 7, or 6', 7' and 10 are made in a similar manner to that in which the safety treads are formed on metal sheets. The protuberances may be arranged in any desired manner on the surface of the sheet that is directed toward the inside of the dough mixer but, preferably, the arrangement of such protuberances is as shown in Fig. 4, comprising elongated ribs 24 and 25 that are arranged so as to extend substantially perpendicularly to each other and in rows so that the ribs 24 and 25 alternate, as clearly shown in Fig. 4. Each of said ribs is provided with a top surface 26 that curves gradually upwardly from the opposite ends thereof to the mid-portion thereof, and which is transversely straight, as will be obvious upon reference to Fig. 3. Said ribs are further provided with inclined plane side walls 27 extending to the curved wall 26. Because of the varying height of the ribs, the inclined side faces of the ribs meet the surface of the sheet or plate upon which the same are formed in curved lines 30. Thus the ribs 24 and 25 are each of such a character that there will be no decided corners or recesses in which dough will accumulate due to the provision thereof. At the same time projecting surfaces are provided that have gradually curved top faces rising to considerable height at the center of each thereof. Furthermore the ribs 24 and 25 extend at right angles to each other so that the gripping action exerted by the projections or ribs 24 and 25 will be substantially uniform on the mass of dough that contacts the dough mixer wall on which these are provided.

The agitator rotates in the direction indicated by the arrow in Figs. 1 and 2, and this will cause the dough to be engaged with the ribs or projections, and when an arm 20, such as the one extending to the right from the shaft 19 in Figs. 1 and 2, leaves the wall of the mixing chamber as it travels upwardly in its rotative movement, the bar or rod-like member 22 or similar member on the agitator will pull on the dough that is being mixed and this pulling effect will be very decided due to the retarding or gripping effect exerted by the irregular or roughened surface provided by means of the alternating rows of ribs 24 and 25. At the same time a very great amount of cooling surface is provided in contact with the dough, and the dough is in contact with such a cooling surface longer than if such projections or protuberances are not provided.

While the roughened surfaced wall is shown as being provided over the entire dough engaging portion of the mixer shown in Fig. 1 and over the entire stationary dough engaging portion of the mixer shown in Fig. 2, and while this is preferred, the most important thing is that the roughened surface provided by means of the small rib-like protuberances 24 and 25 be provided where the agitator travels closely adjacent the wall of the dough mixer, such as at the curved portion 7 and the portions of the inclined wall 6 adjacent the curved wall 7, the curved wall 7' and the portions of the walls 6' and 10 adjacent said curved wall 7', as both the maximum cooling effect and the maximum pulling effect take place over these areas of the dough mixer wall. The most important location for such a gripping wall as I have provided is that adjacent the point where the longitudinal member 22 of the agitator 8 is leaving the dough engaging wall of the mixer as it travels upwardly from the position shown therefor on the arm 20 extending to the right of the shaft 19 in Figs. 1 and 2.

In both forms of the invention a suitable outer jacket 28 or 28' is provided for the dough mixer and suitable heat insulating material 29 or 29' is provided between the cooling coil and said jacket.

Not only is the refrigerated dough engaging wall more efficient as refrigerating means and as means for providing the desired agitation of the dough by the pulling action that occurs between said wall and the agitator, but a structure is provided that is more easily kept clean than where large alternating projections and valleys exist, as in the case where a corrugated wall is formed by means of adjacent curved wall conduit portions. At the same time it is not necessary to provide a smooth faced inner wall on the side of the mixer from which discharge of the dough occurs in the case of a tiltable mixer, as would be the case where large corrugations are provided, because the dough will readily pass from the mixer, even though the entire bowl walls 6 and 7 are provided with the roughening. At the same time the desired gripping action is obtained when the dough is being agitated in the usual manner by means of a rotating agitator member, such as the member 8 shown in the drawings.

In order that the projections 23 would show clearly in Figs. 1 and 2 of the drawings, the height thereof from the face of the sheet from which the walls 6, 7, 6', 7' and 10 are made is somewhat exaggerated. Due to the fact that the ribs or protuberances 24 and 25 are not very high, and there are considerable smooth areas of the sheet 6, for example, as shown in Fig. 4, between these projections or protuberances 24 and 25, it is obvious that the cleaning of the dough mixer wall will be greatly facilitated over that which would be possible where large corrugations occur, providing alternating ribs and valleys or grooves, as in my above referred to patent. At the same time the plurality of shallow or low rib-like protuberances or projections provide, because of their regularity of spacing and the large number thereof, a substantially greater gripping action than the corrugations provide. Furthermore the many small projections or ribs 24 and 25 act in a similar manner to cooling fins, in that these provide projecting contact areas on the surface of the wall with which the dough engages to more readily extract heat from the dough than would be true of a smooth surfaced sheet.

What I claim is:

1. In a dough mixer, a mixing chamber having a wall, means in said chamber for repeatedly contacting a mass of dough with said wall, means secured to the outer face of said wall to form refrigerant conduits therewith, said wall having a dough contacting face having a plurality of short ribs projecting therefrom, said ribs being arranged in sets extending angularly to each other.

2. In a dough mixer, a mixing chamber having a wall and means in said chamber for repeatedly contacting a mass of dough with said wall, said wall having a dough contacting face having a plurality of short ribs gradually increasing in height from the ends toward the middle thereof projecting therefrom.

3. In a dough mixer, a mixing chamber having a wall and means in said chamber for repeatedly contacting a mass of dough with said wall, said wall having a dough contacting face having a plurality of short ribs gradually increasing in height from the ends toward the middle thereof projecting therefrom, said ribs being arranged in sets extending angularly to each other.

MERLIN A. STICELBER.

REFERENCES CITED

The following references are of record in the file of this patent:

UNITED STATES PATENTS

| Number | Name | Date |
| --- | --- | --- |
| 110,029 | Gillander | Dec. 13, 1870 |
| 193,090 | Jenne et al. | July 17, 1877 |
| 830,615 | Rankin | Sept. 11, 1906 |
| 1,395,171 | Bishop, Jr. | Oct. 25, 1921 |
| 1,426,444 | Allison | Aug. 22, 1922 |
| 1,833,992 | Hamilton | Dec. 1, 1931 |
| 2,111,356 | Christensen | Mar. 15, 1938 |
| 2,415,711 | Sticelber | Feb. 11, 1947 |